United States Patent [19]
Scrace

[11] Patent Number: 5,970,705
[45] Date of Patent: Oct. 26, 1999

[54] VARIABLE CONFIGURATION FINAL NOZZLE ASSEMBLY FOR A COMBINED ROCKET/RAMJET ENGINE

[75] Inventor: Harold Alan Scrace, Bristol, United Kingdom

[73] Assignee: Rolls Royce, Limited, London, United Kingdom

[21] Appl. No.: 06/178,554

[22] Filed: Aug. 15, 1980

[30] Foreign Application Priority Data

Aug. 17, 1979 [GB] United Kingdom .................... 7928756

[51] Int. Cl.⁶ ................................ F02K 1/00; B05B 12/00
[52] U.S. Cl. .................. 60/271; 239/265.37; 239/265.41
[58] Field of Search .................. 60/271, 233; 239/127.1, 239/265.33, 265.37, 265.39, 265.41

[56] References Cited

U.S. PATENT DOCUMENTS

| | | | |
|---|---|---|---|
| 3,190,070 | 6/1965 | Neu ...................................... | 239/127.1 |
| 3,352,494 | 11/1967 | Colville et al. ..................... | 239/265.33 |
| 3,914,935 | 10/1975 | Burkes ...................................... | 60/271 |

FOREIGN PATENT DOCUMENTS 1235386  5/1960  France ............................... 239/265.33
898961   6/1962  United Kingdom .

*Primary Examiner*—Charles T. Jordan
*Assistant Examiner*—Theresa M. Wesson
*Attorney, Agent, or Firm*—Oliff & Berridge, PLC

[57] ABSTRACT

A variable configuration final nozzle assembly for a combined rocket/ramjet engine consists of a fixed annular plug 20 together with upstream and downstream arrays of flaps 10,14 pivoted to the wall of a jet pipe 1 at their upstream and downstream ends 12,16 respectively. In the rocket mode of operation the upstream and downstream flaps are pivoted inwardly and locked in contact with the annular plug to form convergent and divergent portions 2,4 of a nozzle for the rocket exhaust which passes through the plug where a nozzle throat is defined by the internal surface of the plug. In the ramjet mode of operation the flaps lie alongside the jet pipe wall and ramjet exhaust gas flows through and around the plug. A second throat 50 is defined for the flow through the annular nozzle surrounding the plug and flow conditions in both parts of the flow are matched. The plug is cooled by ramjet fuel which is conveniently used to operate a piston and cylinder arrangement 30,32,34 to release locking rings 26,28 to allow the flaps to move between their two positions under the influence of gas pressure in the jet pipe.

5 Claims, 2 Drawing Sheets

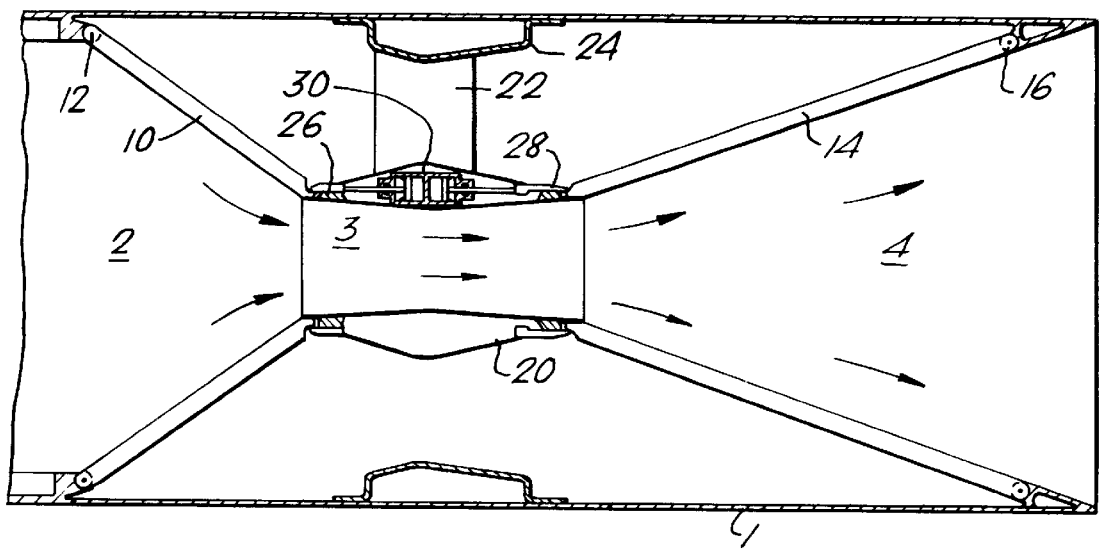
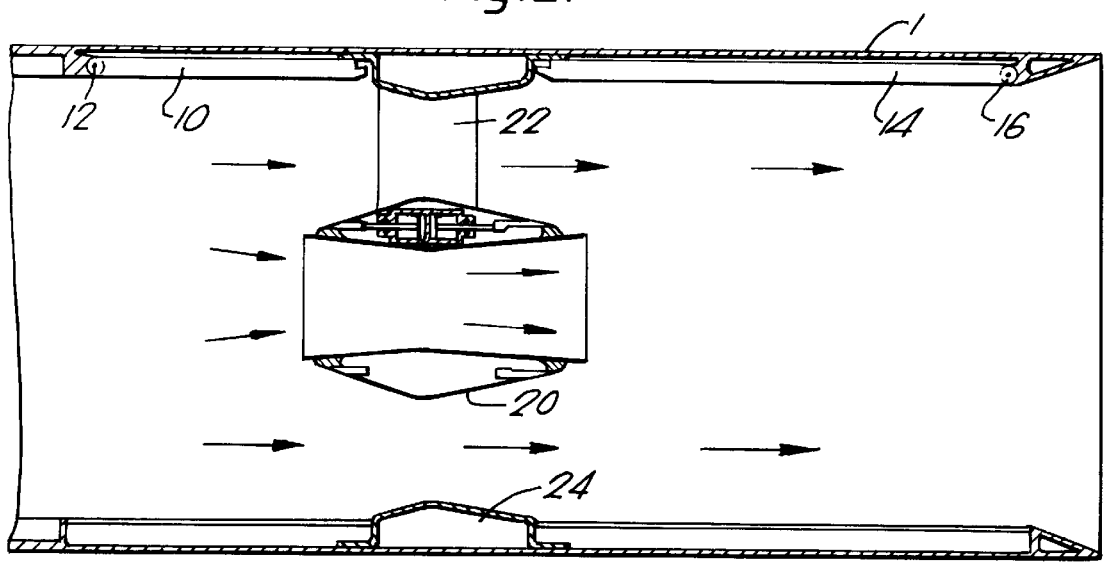

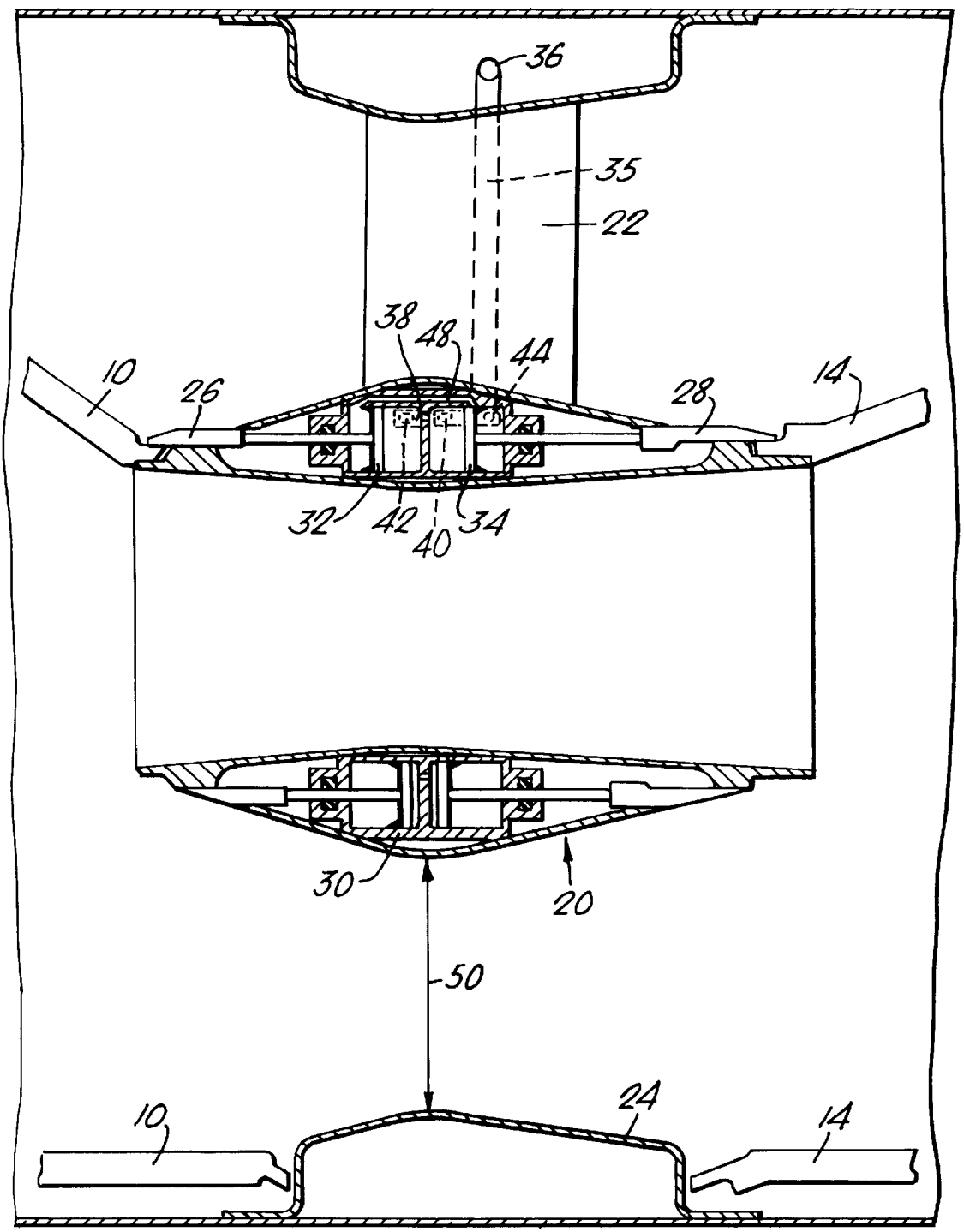

VARIABLE CONFIGURATION FINAL NOZZLE ASSEMBLY FOR A COMBINED ROCKET/RAMJET ENGINE

DESCRIPTION

The present invention relates to a variable configuration final nozzle assembly which is particularly suitable for use in a combined rocket/ramjet engine.

Rocket/ramjet engine combinations are usually designed for use in missiles so that the engines are disposable. To operate in the two different engine modes, i.e. rocket boost mode for missile take-off and ramjet mode for missile cruise, it is necessary to provide a nozzle of variable configuration to obtain the optimum efficiency from both modes.

Variable area convergent or convergent-divergent nozzles are well known from the field of gas turbine and ramjet engines, but in each case the nozzle may be operated in its different area configurations more than once in the same flight, and many different complex mechanisms have been produced in the past to enable the areas of these nozzles to be varied from one configuration to another and back again at will. These prior variable area nozzles are not therefore suitable for missile applications where minimum cost and simplicity are the main criteria.

Another difficulty with the prior variable area nozzles is that they are operated by a pilots lever, but in a pilotless missile a fully automatic system must be used. This problem has been dealt with in the past in rocket engines and combined rocket/ramjet engines by providing appropriately shaped nozzles for the boost mode and the cruise mode on different parts of the missile, and explosively removing the rocket nozzle when the boost charge is spent to leave the ramjet or cruise rocket nozzle behind with the correct nozzle configuration.

A disadvantage with this system is that if the missile is launched from an aircraft the debris discharged from the missile may damage the aircraft flying behind it.

An object of the present invention is to provide a variable configuration nozzle which can be changed automatically from the rocket boost mode to the ramjet mode without discharging any nozzle parts.

Another object is to provide a variable configuration nozzle which can be changed from a first configuration to a second configuration only, and which is simple in construction and has very few moving parts.

According to the present invention a variable configuration final nozzle assembly for a combined rocket/ramjet engine comprises, a jet pipe, an annular plug disposed centrally within the jet pipe and having inner and outer surfaces over which exhaust gases in the jet pipe flow, and two arrays of nozzle flaps pivoted to the jet pipe at points, one upstream and one downstream of the annular plug, said nozzle-flaps being movable between first and second positions to define nozzle configurations for the rocket boost and ramjet modes of operation of the engine respectively, said nozzle flaps in the first position extending inwardly to contact the annular plug to define convergent and divergent portions of the nozzle and to constrain the exhaust gases to flow through the plug, the radially inner surface of which is shaped to define a fixed throat area for the nozzle in this mode of operation of the engine, said nozzle flaps in the second position lying alongside the jet pipe wall to allow the exhaust gases to flow additionally through an annular nozzle defined between the annular plug and the jet pipe.

The nozzle assembly of the present invention can be built into the missile in its first configuration and locked in that configuration until such time as the second configuration is required, when the means locking the flaps to the annular plug are released and the pressure of the exhaust gas on the flaps pushes them back onto the jet pipe wall. Thus, the only actuating mechanism required is the mechanism to release the locking means.

In a particular, preferred, form of the invention the annular plug is attached to the jet pipe by means of one or more aerofoil struts, the strut or struts and the annular plug being cooled by fuel from the ramjet fuel supply. This has the advantages that the ramjet fuel, or at least a part of it, can be preheated by passage through the hot struts and plug during the rocket boost mode of operation, and that the fuel can be used as the operating medium for the unlocking the flaps of the nozzle when required.

Thus, another preferred feature of the invention is that the annular plug is hollow and contains a piston and cylinder arrangement operated by fuel to move a locking ring attached thereto to release the flaps to allow them to move to the second position.

In an alternative construction, the annular plug may be made from a highly heat resistant material such as carbon, molybdenum or suitably coated ceramic material, and need not be cooled.

The shape of the radially inner and outer surfaces of the annular plug may be different for different engine requirements, but in general the shape of the radially inner surface is dictated by the position of the throat of the boost nozzle where sonic conditions are required, and the angles of the upstream and downstream flaps. The shape of the radially outer surface, however, is dictated by the need to ensure that conditions in the exhaust gas flow around the plug are matched to those of the flow through the plug at the outlet of the plug in the ramjet mode of operation. To this end a throat is defined between the radially outer surface of the plug and the jet pipe wall to produce sonic conditions in the annular nozzle.

The invention will now be more particularly described, by way of example only, with reference to the accompanying drawings in which:

FIG. 1 is a sectional elevation of the jet pipe and final exhaust nozzle of a missile engine showing the nozzle in the rocket boost configuration;

FIG. 2 is a view as in FIG. 1 showing the nozzle in the ramjet configuration; and FIG. 3 is an enlarged view of the actuating mechanism for the locking ring shown in FIGS. 1 and 2.

Referring now to the drawings, there is shown a cylindrical missile engine jet pipe 1 including a variable configuration final exhaust nozzle. The nozzle in the configuration illustrated in FIG. 1 consists of three main portions, a convergent upstream portion 2, a throat portion 3, and a divergent downstream portion 4.

The convergent portion 2 is formed by an array of flaps 10 disposed around the internal surface of the pipe and pivoted thereto at their upstream ends by means of pivots 12. The flaps are trapezoidal in shape and extend inwardly and in a downstream direction from the pivots 12 to contact the throat portion 3.

Similarly, the divergent portion 4 comprises a second array of flaps 14 disposed around the internal surface of the jet pipe and pivoted thereto at their downstream ends by means of pivots 16. The flaps 14 are also trapezoidal in shape and extend inwardly and in an upstream direction from the pivots 16 to contact the throat portion 3.

The throat portion 3 is defined within an annular plug 20 which is supported from the jet pipe 1, by means of three aerofoil shaped struts 22 (only one shown) which are connected to a support ring 24 on the jet pipe. The radially inner surface of the annular plug 20 is shaped to define the throat for the convergent-divergent nozzle formed by the flaps 10, the throat portion 20, and the flaps 14, for the rocket boost mode. The shape of the radially inner surface is in part dictated by the angles required for efficient contraction and expansion of the gas flow through the upstream convergent portion and the downstream divergent portion, respectively, of the nozzle which define the inlet and outlet angles of the throat portion. For example, the included angle of the flow leaving the nozzle throat should not be more than 40°.

Further criteria for the nozzle design are to provide, the optimum area ratios of the outer and inner flows around and through the annular plug in the ramjet mode of operation, and to ensure that the nozzle should be as light as possible and cause the minimum obstruction in the flow.

The annular plug 20 is hollow and is fuel cooled by supply of fuel from the ramjet fuel system which can be conveniently passed through the struts 22 from the hollow ring 24 which forms, or may house, a fuel manifold. This has the advantage that at least a part of the ramjet fuel change is circulating around a circuit including the annular plug as a heater, to warm up the ramjet fuel for starting.

The flaps are held in place in the rocket boost mode of operation by locking rings 26 and 28 respectively on the upstream and downstream ends of the annular plug. The locking rings are each released by the action of a fuel operated piston and cylinder arrangement within the plug body shown in more detail in FIG. 3 and described hereinafter. When the rocket boost mode is finished and the ramjet mode comes into operation the drop in combustion chamber pressure can be sensed to operate a valve allowing fuel into the cylinders for releasing the locking rings 26 and 28.

Referring now to FIG. 3, a cylinder 30 is provided in the annular plug, and two pistons 32,34 are arranged in the cylinder, one connected to each of the rings 26,28. Fuel from the ramjet fuel system is supplied via a fuel line 35, from a manifold 36 to a spool valve 38 having a port 40 for supplying fuel to the cylinder on one side of each piston, a port 42 for returning fuel to the fuel system, and a port 4 for supplying fuel to the other side of piston 34. During the rocket boost mode of operation the spool valve keeps port 40 open and port 44 closed. This can easily be arranged by supplying a pressure from the combustion chamber pressure sensor to one end of the spool. When the boost mode is over and the sensor pressure decays and fuel pressure is arranged to move the spool to close port 40 and open port 44 thus supplying fuel pressure to the other side of piston 34 and moving it along the cylinder to release the flaps 14 from ring 28. When piston 34 reaches the end of its travel it opens a port in the cylinder wall allowing fuel now to pass along a passage 48 to the other side of piston 32 to move it to release the flaps 10 from ring 26. The flaps 14,10 are moved to lie alongside the jet pipe wall by exhaust gas pressure in the nozzle. Filler pieces on the jet pipe wall fill the spaces between the trapezoidal flaps to provide a smooth surface when the flaps are in this position. The above described flap actuation system using ramjet fuel as the power source is just one convenient way in which movement of the flaps can be made fully automatic. Clearly, many other forms of actuation either mechanical or electrical could be employed and would be within the skill of a competent designer.

In the ramjet mode of operation there is thus a second annular nozzle defined between the outer surface of the annular plug 20 and the inner wall of the jet pipe through which the ramjet exhaust flows to the final outlet at the end of the jet pipe. It is important that the flow conditions through the two nozzles defined within and around the annular plug are matched as nearly as possible. A throat 50, therefore, is defined for the annular nozzle by suitably shaping either the outer surface of the annular plug, or the inner wall of the jet pipe, or both, as illustrated in the Figures. In addition, the flow area of the annular nozzle is arranged to be such that at certain key points along the jet pipe the area ratios of the flows through the two nozzles are equal. These points are preferably arranged to be at the planes of the upstream and downstream ends of the annular plug and at the throats of the two nozzles.

Thus, the above described nozzle assembly provides for a variable configuration between the rocket boost and ramjet modes of operation, without the use of complex jack systems, and is fully automatic.

I claim:

1. A variable configuration final nozzle assembly for a rocket/ramjet engine comprising a jet pipe, an annular plug disposed centrally within the jet pipe and having inner and outer surfaces over which exhaust gases in the jet pipe flow, and two arrays of nozzle flaps, one upstream and one downstream of the annular plug, means pivotably connecting the nozzle flaps to the jet pipe for movement between first and second positions to define nozzle configurations for the rocket boost and ramjet modes of operation of the first position extending inwardly to contact the annular plug to define convergent and divergent portions of the nozzle and to constrain the exhaust gases to flow through the plug, the radially inner surface of which is shaped to define a fixed throat area for the nozzle in this mode of operation of the engine, said nozzle flaps in the second position lying alongside the jet pipe wall to allow the exhaust gases to flow additionally through an annular nozzle defined between the annular plug and the jet pipe, and means for locking the flaps in their first positions in the rocket boost mode of operation, said means being operable to release the two arrays of flaps sequentially to allow them to move into their second positions under the influence of gas pressure within the nozzle, the downstream array being released before the upstream array.

2. A nozzle assembly as claimed in claim 1 and in which the annular plug is attached to the jet pipe by means of at least one aerofoil strut and the plug is cooled by fuel supplied from the ramjet fuel system.

3. A nozzle assembly as claimed in claim 1 and in which the plug is fuel cooled, the means operable to release the two arrays of flaps being operated by said fuel.

4. A nozzle assembly as claimed in claim 3 and in which the means operable to release the two arrays of flaps comprises a piston and cylinder arrangement.

5. A nozzle assembly as claimed in claim 1 and in which the radially outer surface of the annular plug is shaped to define in conjunction with the radially inner wall of the jet pipe both a throat and a varying flow area along the annular nozzle such that the area ratios of the two flows both through and around the annular plug are equal at axial positions defined by the upstream and downstream ends of the annular plug and at the throats of the two nozzles.

* * * * *